United States Patent
Weidner (10) Patent No.: US 10,411,525 B2
(45) Date of Patent: Sep. 10, 2019

(54) SYSTEM AND METHOD FOR FREQUENCY PREDICTION

(71) Applicant: WiTricity Corporation, Watertown, MA (US)

(72) Inventor: Felix Weidner, Munich (DE)

(73) Assignee: WiTricity Corporation, Watertown, MA (US)

( * ) Notice: Subject to any disclaimer, the term of this patent is extended or adjusted under 35 U.S.C. 154(b) by 263 days.

(21) Appl. No.: 15/452,400

(22) Filed: Mar. 7, 2017

(65) Prior Publication Data

US 2018/0262065 A1    Sep. 13, 2018

(51) Int. Cl.
*H02J 50/90* (2016.01)
*H02J 50/12* (2016.01)
*H02J 7/02* (2016.01)

(52) U.S. Cl.
CPC .............. *H02J 50/90* (2016.02); *H02J 50/12* (2016.02); *H02J 7/025* (2013.01)

(58) Field of Classification Search
CPC .. H02J 5/005; H02J 7/025; H02J 17/00; H02J 50/10; H02J 50/12
USPC .......................................... 320/108; 307/104
See application file for complete search history.

(56) References Cited

U.S. PATENT DOCUMENTS

| | | | |
|---|---|---|---|
| 2009/0284218 A1 | 11/2009 | Mohammadian et al. | |
| 2014/0015327 A1* | 1/2014 | Keeling ................ | B60L 11/182 307/104 |
| 2015/0061578 A1 | 3/2015 | Keeling et al. | |
| 2015/0200548 A1* | 7/2015 | Covic ..................... | H02J 50/12 307/104 |
| 2017/0025900 A1* | 1/2017 | Amari ..................... | H02J 50/12 |

OTHER PUBLICATIONS

Aldhaher S., et al., "Electronic Tuning of Misaligned Coils in Wireless Power Transfer Systems," IEEE Transactions on Power Electronics, 2014, vol. 29 (11), pp. 5975-5982.
Heebl J.D., et al., "Comprehensive Analysis and Measurement of Frequency-Tuned and Impedance-Tuned Wireless Non-Radiative Power Transfer Systems," arXiv:1401.3324v1 [cs.OH], Jan. 14, 2014, pp. 1-11.

(Continued)

*Primary Examiner* — David V Henze-Gongola
(74) *Attorney, Agent, or Firm* — Knobbe, Martens, Olson & Bear, LLP (57) ABSTRACT

Systems and methods for setting an operating frequency for wireless charging systems. The wireless charging system comprises a transmitter circuit configured to generate a magnetic field in response to a current having an operating frequency and driving the transmitter circuit, and a receiver circuit configured to receive power via the magnetic field. The transmitter circuit and the receiver circuit are separated by an offset distance that contributes to a level of detuning between the transmitter and receiver circuits. To reduce a level of detuning, a level of coupling between the transmitter and receiver circuits is determined based upon a measured current or voltage value associated with the receiver circuit. From the determined level of coupling, the offset distance can be estimated. The offset distance may be used to determine a desired operating frequency for reducing the level of detuning between the transmitter circuit and the receiver circuit.

28 Claims, 9 Drawing Sheets

(56) References Cited

OTHER PUBLICATIONS

Beh T.C. et al., "Basic Study of Improving Efficiency of Wireless Power Transfer via Magnetic Resonance Coupling Based on Impedance Matching", Industrial Electronics (ISIE), 2010 IEEE International Symposium on, Jul. 2010, pp. 2011-2016.

* cited by examiner

| | Z-Gap | Freq [85kHz] | coupling | I_BP [A] | I_VP [A] | P_out [kW] | S_total [kVA] |
|---|---|---|---|---|---|---|---|
| Tuning point | 160 | 85 | 13.70% | 38.65 | 44.88 | 6.7 | 6.99 |
| Inductance variation BP: 6,5% VP: 10,5 | 100 | 85 | 21.70% | 30.3 | 44.95 | 6.7 | 8.85 |
| Inductance variation BP: 6,5% VP: 10,5 | 100 | 81.5 | 21.70% | 26.85 | 43.31 | 6.7 | 7.56 |

SYSTEM AND METHOD FOR FREQUENCY PREDICTION

FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless power transfer systems that are capable of transferring power in free space (e.g., via a wireless field) to be used to charge the electric vehicle to overcome some of the deficiencies of wired charging solutions.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In some embodiments, an apparatus for wirelessly receiving power from a transmitter circuit configured to generate a magnetic field is provided. The apparatus comprises a receiver circuit configured to receive power via the magnetic field generated in response to a current having an operating frequency and driving the transmitter circuit. The transmitter circuit and the receiver circuit are separated by an offset distance that contributes to a level of detuning between the transmitter and receiver circuits. The apparatus further comprises a controller circuit operationally coupled to the receiver circuit. The controller circuit is configured to determine a level of coupling between the transmitter and receiver circuits, based on a measured current or voltage value associated with the receiver circuit. The controller circuit is further configured to identify at least one storage location comprising pre-determined values associating different levels of coupling with operating frequencies. A particular operating frequency associated with a particular level of coupling is selected such that for the particular level of coupling, the level of detuning between the transmitter circuit and the receiver circuit is reduced when the current driving the transmitter circuit is operated at the particular operating frequency. The controller circuit is further configured to determine, from the at least one storage location, an updated operating frequency of the current driving the transmitter circuit and corresponding to the determined level of coupling.

In some embodiments, a method for setting an operating frequency in a wireless charging system is provided. The wireless charging system comprises a transmitter circuit configured to generate a magnetic field in response to a current having an operating frequency and driving the transmitter circuit, and a receiver circuit configured to receive power via the magnetic field. The transmitter circuit and the receiver circuit are separated by an offset distance that contributes to a level of detuning between the transmitter and receiver circuits. The method comprises determining a level of coupling between the transmitter and receiver circuits, based on a measured current or voltage value associated with the receiver circuit. The method further comprises identifying at least one storage location comprising pre-determined values associating different levels of coupling with operating frequencies. A particular operating frequency associated with a particular level of coupling is selected such that for the particular level of coupling, the level of detuning between the transmitter circuit and the receiver circuit is reduced when the current driving the transmitter circuit is operated at the particular operating frequency. The method further comprises determining, from the at least one storage location, an updated operating frequency of the current driving the transmitter circuit and corresponding to the determined level of coupling.

DETAILED DESCRIPTION

The detailed description set forth below in connection with the appended drawings is intended as a description of exemplary implementations and is not intended to represent the only implementations in which the present disclosure may be practiced. The term "exemplary" used throughout this description means "serving as an example, instance, or illustration," and should not necessarily be construed as preferred or advantageous over other exemplary implementations. The detailed description includes specified details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

Figure 1:
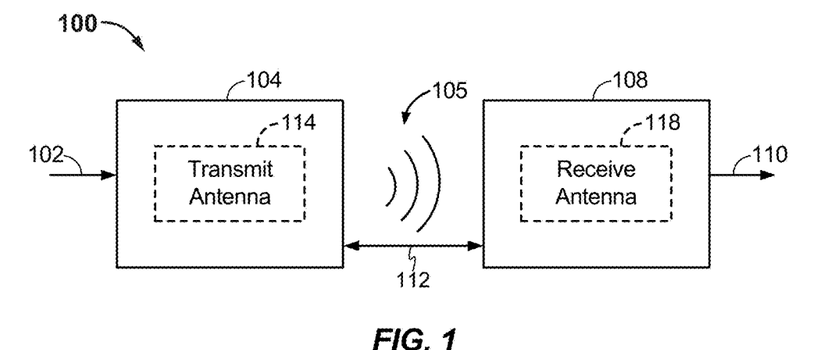
FIG. 1 is a functional block diagram of a wireless power transfer system, in accordance with one exemplary implementation.

FIG. 1 is a functional block diagram of a wireless power transfer system 100, in accordance with one exemplary implementation. Input power 102 may be provided to a transmitter 104 from a power source (not shown) to generate a wireless (e.g., magnetic or electromagnetic) field 105 for performing wireless power transfer. A receiver 108 may couple to the wireless field 105 and generate output power 110 for storage or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The wireless field 105 may also operate over a longer distance than is considered "near field." The transmitter 104 may include a transmit antenna 114 (e.g., a coil) for transmitting energy to the receiver 108. The receiver 108 may include a receive antenna or coil 118 for receiving or capturing energy transmitted from the transmitter 104. The near-field may correspond to a region in which there are strong reactance fields resulting from the currents and charges in the transmit antenna 114 that minimally radiate power away from the transmit antenna 114. The near-field may correspond to a region that is within about one wavelength (or a fraction thereof) of the transmit antenna 114. In some, transmitter 104 may correspond to a base pad of a base charging station, while receiver 108 may correspond to a vehicle pad of an electrical vehicle.

Figure 2:
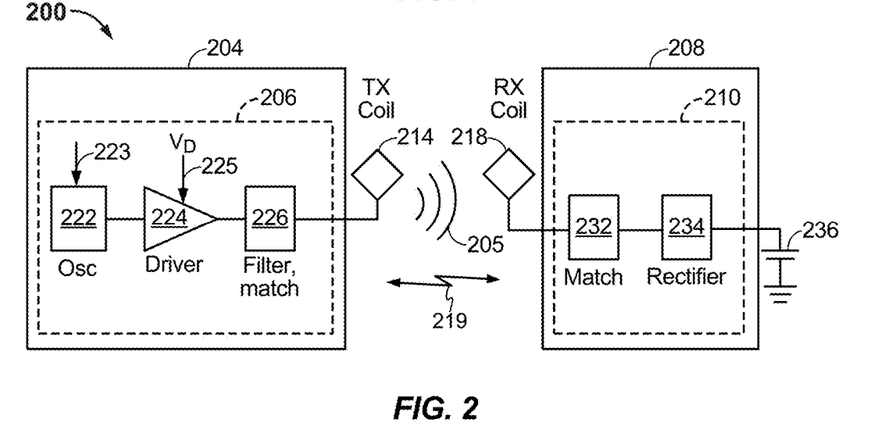
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal ($V_D$) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the impedance of the transmit antenna 214. As a result of driving the transmit antenna 214, the transmit antenna 214 may generate a wireless field 205 to wirelessly output power at a level sufficient for charging a battery 236.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternating current (AC) power input to charge the battery 236, as shown in FIG. 2. The receiver 208 and the transmitter 204 may additionally communicate on a separate communication channel 219 (e.g., Bluetooth, ZigBee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
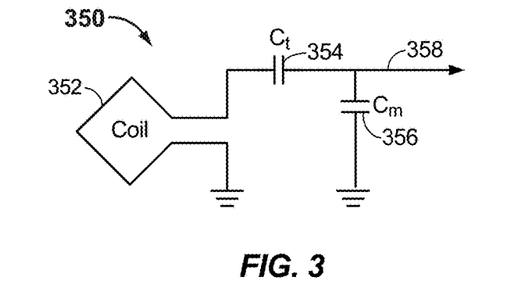
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2 including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power. The antenna 352 may include an air core or a physical core such as a ferrite core (not shown).

The transmit or receive circuitry 350 may form/include a resonant circuit. The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit. For a transmit circuitry, a signal 358 may be an input at a resonant frequency to cause the antenna 352 to generate a wireless field 105/205. For receive circuitry, the signal 358 may be an output to power or charge a load (not shown). For example, the load may comprise a wireless device configured to be charged by power received from the wireless field.

Other resonant circuits formed using other components are also possible. As another non-limiting example, a capacitor may be placed in parallel between the two terminals of the circuitry 350.

Referring to FIGS. 1 and 2, the transmitter 104/204 may output a time varying magnetic (or electromagnetic) field with a frequency corresponding to the resonant frequency of the transmit antenna 114/214. When the receiver 108/208 is within the wireless field 105/205, the time varying magnetic (or electromagnetic) field may induce a current in the receive antenna 118/218. As described above, if the receive antenna 118/218 is configured to resonate at the frequency of the transmit antenna 114/214, energy may be efficiently transferred. The AC signal induced in the receive antenna 118/218 may be rectified as described above to produce a DC signal that may be provided to charge or to power a load.

Figure 4:
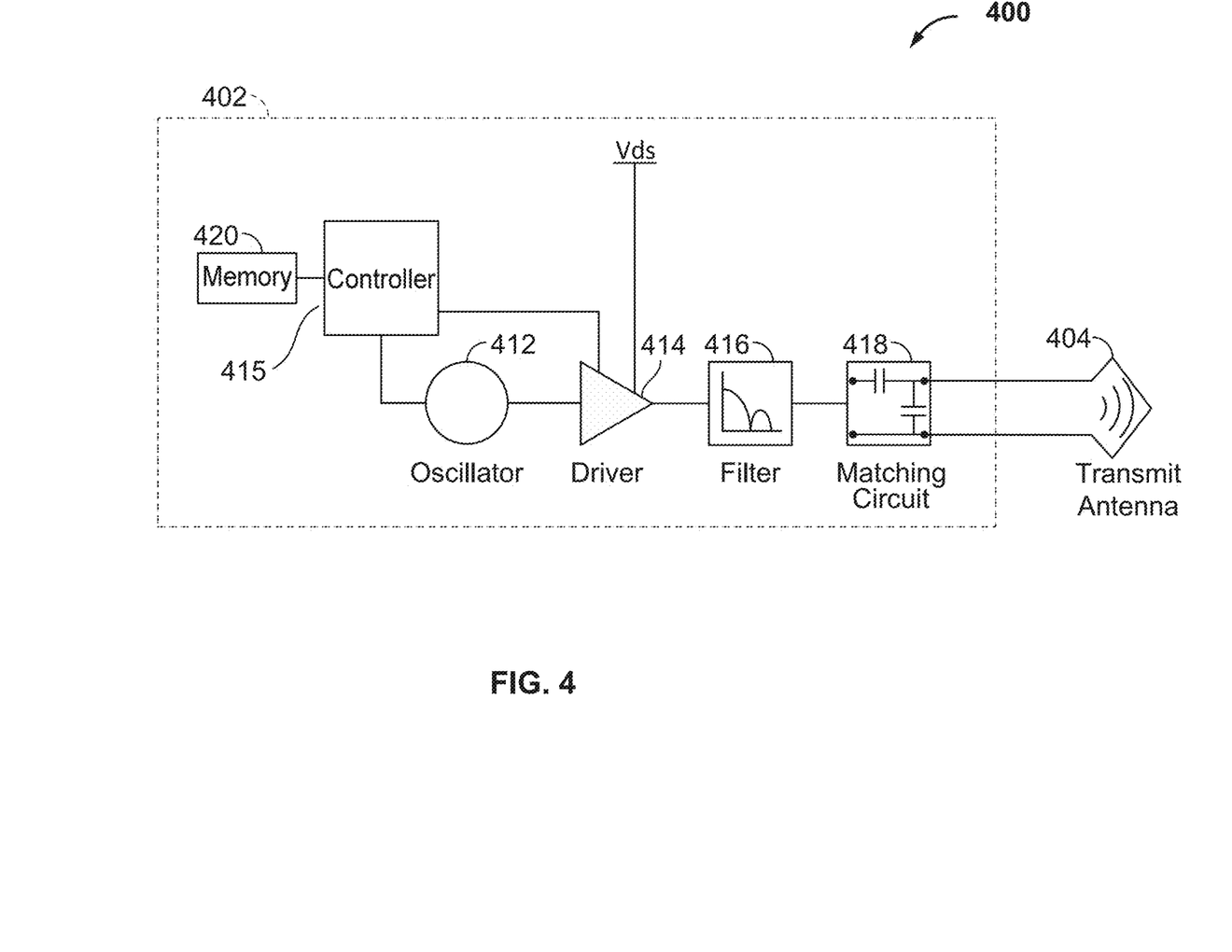
FIG. 4 is a simplified functional block diagram of a transmitter that may be used in an inductive power transfer system, in accordance with exemplary implementations of the present disclosure.

FIG. 4 is a simplified functional block diagram of a transmitter that may be used in an inductive power transfer system, in accordance with exemplary implementations of the present disclosure. As shown in FIG. 4, the transmitter 400 includes transmit circuitry 402 and a transmit antenna 404 operably coupled to the transmit circuitry 402. The transmit antenna 404 may be configured as the transmit antenna 214 as described above in reference to FIG. 2. In some implementations, the transmit antenna 404 may be a coil (e.g., an induction coil). In some implementations, the transmit antenna 404 may be associated with a larger structure, such as a table, mat, lamp, or other stationary configuration. The transmit antenna 404 may be configured to generate an electromagnetic or magnetic field. In an exemplary implementation, the transmit antenna 404 may be configured to transmit power to a receiver device within a charging region at a power level sufficient to charge or power the receiver device.

The transmit circuitry 402 may receive power through a number of power sources (not shown). The transmit circuitry 402 may include various components configured to drive the transmit antenna 404. In some exemplary implementations, the transmit circuitry 402 may be configured to adjust the transmission of wireless power based on the presence and constitution of the receiver devices as described herein. As such, the transmitter 400 may provide wireless power efficiently and safely.

The transmit circuitry 402 may further include a controller 415. In some implementations, the controller 415 may be a micro-controller. In other implementations, the controller 415 may be implemented as an application-specified integrated circuit (ASIC). The controller 415 may be operably connected, directly or indirectly, to each component of the transmit circuitry 402. The controller 415 may be further configured to receive information from each of the components of the transmit circuitry 402 and perform calculations based on the received information. The controller 415 may be configured to generate control signals for each of the components that may adjust the operation of that component. As such, the controller 415 may be configured to adjust the power transfer based on a result of the calculations performed by it.

The transmit circuitry 402 may further include a memory 420 operably connected to the controller 415. The memory 420 may comprise random-access memory (RAM), electrically erasable programmable read only memory (EEPROM), flash memory, or non-volatile RAM. The memory 420 may be configured to temporarily or permanently store data for use in read and write operations performed by the controller 415. For example, the memory 420 may be configured to store data generated as a result of the calculations of the controller 415. As such, the memory 420 allows the controller 415 to adjust the transmit circuitry 402 based on changes in the data over time.

The transmit circuitry 402 may further include an oscillator 412 operably connected to the controller 415. The oscillator 412 may be configured as the oscillator 222 as described above in reference to FIG. 2. The oscillator 412 may be configured to generate an oscillating signal (e.g., radio frequency (RF) signal) at the operating frequency of the wireless power transfer. In some exemplary implementations, the oscillator 412 may be configured to operate at the 6.78 MHz ISM frequency band. The controller 415 may be configured to selectively enable the oscillator 412 during a transmit phase (or duty cycle). The controller 415 may be further configured to adjust the frequency or a phase of the oscillator 412 which may reduce out-of-band emissions, especially when transitioning from one frequency to another. As described above, the transmit circuitry 402 may be configured to provide an amount of power to the transmit antenna 404, which may generate energy (e.g., magnetic flux) about the transmit antenna 404.

The transmit circuitry 402 may further include a driver circuit 414 operably connected to the controller 415 and the oscillator 412. The driver circuit 414 may be configured as the driver circuit 224 as described above in reference to FIG. 2. The driver circuit 414 may be configured to drive the signals received from the oscillator 412, as described above.

The transmit circuitry 402 may further include a low pass filter (LPF) 416 operably connected to the transmit antenna 404. The low pass filter 416 may be configured as the filter portion of the filter and matching circuit 226 as described above in reference to FIG. 2. In some exemplary implementations, the low pass filter 416 may be configured to receive and filter an analog signal of current and an analog signal of voltage generated by the driver circuit 414. The analog signal of current may comprise a time-varying current signal, while the analog signal of current may comprise a time-varying voltage signal. In some implementations, the low pass filter 416 may alter a phase of the analog signals. The low pass filter 416 may cause the same amount of phase change for both the current and the voltage, canceling out the changes. In some implementations, the controller 415 may be configured to compensate for the phase change caused by the low pass filter 416. The low pass filter 416 may be configured to reduce harmonic emissions to levels that may prevent self-jamming. Other exemplary implementations may include different filter topologies, such as notch filters that attenuate specified frequencies while passing others.

The transmit circuitry 402 may further include a fixed impedance matching circuit 418 operably connected to the low pass filter 416 and the transmit antenna 404. The matching circuit 418 may be configured as the matching portion of the filter and matching circuit 226 as described above in reference to FIG. 2. The matching circuit 418 may be configured to match the impedance of the transmit circuitry 402 (e.g., 50 ohms) to the transmit antenna 404. Other exemplary implementations may include an adaptive impedance match that may be varied based on measurable transmit metrics, such as the measured output power to the transmit antenna 404 or a DC current of the driver circuit 414. The transmit circuitry 402 may further comprise discrete devices, discrete circuits, and/or an integrated assembly of components.

Transmit antenna 404 may be implemented as an antenna strip with the thickness, width and metal type selected to keep resistance losses low.

Figure 5:
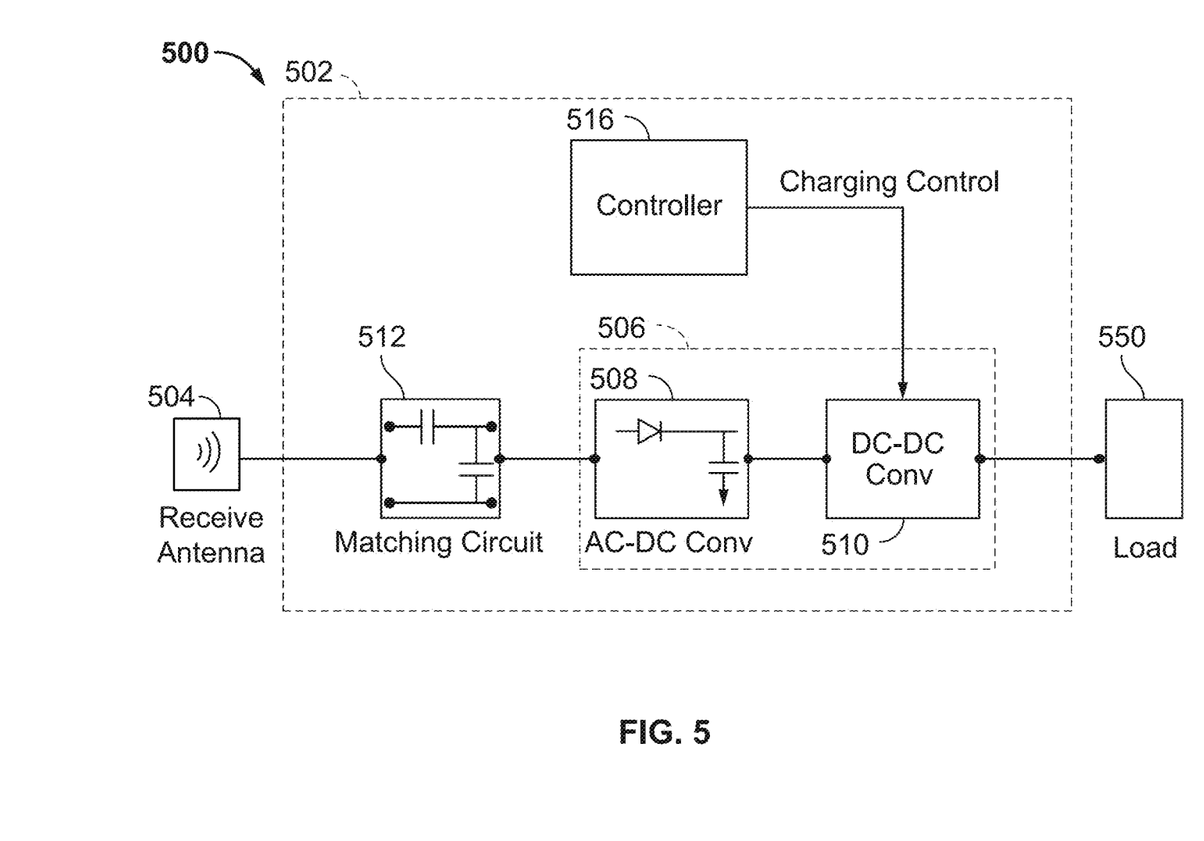
FIG. 5 is a simplified functional block diagram of a receiver that may be used in the inductive power transfer system, in accordance with exemplary implementations of the present disclosure.

FIG. 5 is a block diagram of a receiver, in accordance with an implementation of the present disclosure. As shown in FIG. 5, a receiver 500 includes a receive circuitry 502, a receive antenna 504, and a load 550. The receiver 500 further couples to the load 550 for providing received power thereto. Receiver 500 is illustrated as being external to device acting as the load 550 but may be integrated into load 550. The receive antenna 504 may be operably connected to the receive circuitry 502. The receive antenna 504 may be configured as the receive antenna 218 as described above in reference to FIG. 2. In some implementations, the receive antenna 504 may be tuned to resonate at a frequency similar to a resonant frequency of the transmit antenna 404, or within a specified range of frequencies, as described above. The receive antenna 504 may be similarly dimensioned with transmit antenna 404 or may be differently sized based upon the dimensions of the load 550. The receive antenna 504 may be configured to couple to the magnetic field generated by the transmit antenna 404, as described above, and provide an amount of received energy to the receive circuitry 502 to power or charge the load 550.

The receive circuitry 502 may be operably coupled to the receive antenna 504 and the load 550. The receive circuitry may be configured as the receive circuitry 210 as described above in reference to FIG. 2. The receive circuitry 502 may be configured to match an impedance of the receive antenna 504, which may provide efficient reception of wireless power. The receive circuitry 502 may be configured to generate power based on the energy received from the receive antenna 504. The receive circuitry 502 may be configured to provide the generated power to the load 550. In some implementations, the receiver 500 may be configured to transmit a signal to the transmitter 400 indicating an amount of power received from the transmitter 400.

The receive circuitry 502 may include a processor-signaling controller 516 configured to coordinate the processes of the receiver 500 described below.

The receive circuitry 502 provides an impedance match to the receive antenna 504. The receive circuitry 502 includes power conversion circuitry 506 for converting a received energy into charging power for use by the load 550. The power conversion circuitry 506 includes an AC-to-DC converter 508 coupled to a DC-to-DC converter 510. The AC-to-DC converter 508 rectifies the AC energy signal received at the receive antenna 504 into a non-alternating power while the DC-to-DC converter 510 converts the rectified AC energy signal into an energy potential (e.g., voltage) that is compatible with the load 550. Various AC-to-DC converters are contemplated including partial and full rectifiers, regulators, bridges, doublers, as well as linear and switching converters.

The receive circuitry 502 may further include a matching circuit 512. The matching circuit 512 may comprise one or more resonant capacitors in either a shunt or a series configuration. In some implementations these resonant capacitors may tune the receive antenna to a specific frequency or to a specific frequency range (e.g., a resonant frequency).

The load 550 may be operably connected to the receive circuitry 502. The load 550 may be configured as the battery 236 as described above in reference to FIG. 2. In some implementations the load 550 may be external to the receive circuitry 502. In other implementations the load 550 may be integrated into the receive circuitry 502.

Detuning Between Transmitter and Receiver Based Upon Z-Gap

Figure 6:
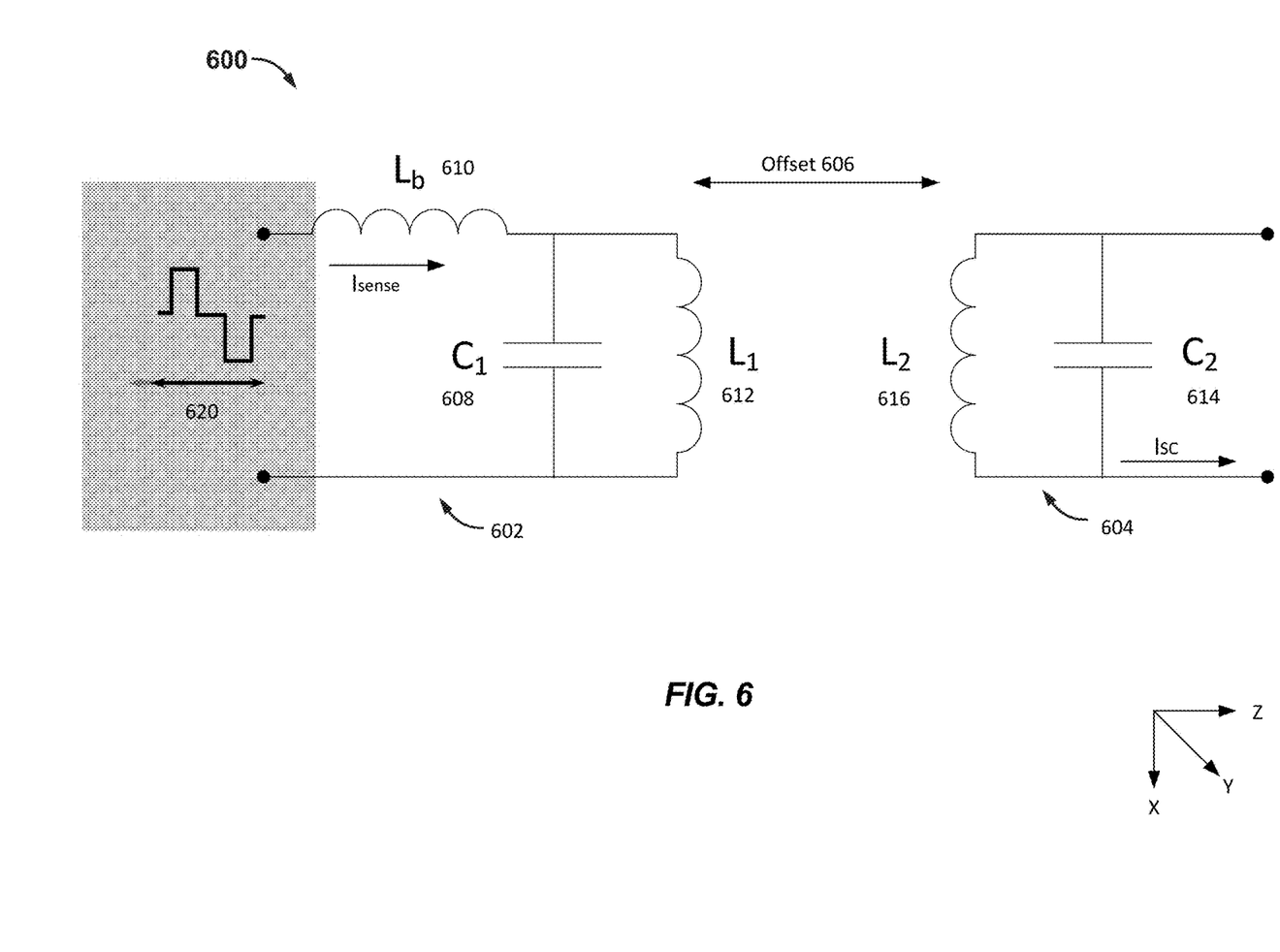
FIG. 6 illustrates a schematic diagram representing capacitances and inductances that may be associated with a transmitter and receiver, in accordance with some embodiments.

FIG. 6 illustrates a schematic diagram representing capacitances and inductances that may be associated with a wireless charging system 600 containing a transmitter 602 and a receiver 604 (sometimes also referred to as transmitter circuit 602 and receiver circuit 604), in accordance with some embodiments. For example, the transmitter 602 illustrated in FIG. 6 may correspond to the transmitter 400 illustrated in FIG. 4. The receiver 604 may correspond to the receiver 500 illustrated in FIG. 5. As discussed above, the transmitter 602 and receiver 604 may comprise respective resonant circuits, each defined by an inductance and/or a capacitance. For example, the transmitter 602 has a capacitance $C_1$ 608 and inductances $L_b$ 610 and $L_1$ 612. The receiver 604 may have a capacitance $C_2$ 614 and an inductance $L_2$ 616. As illustrated in FIG. 6, the capacitances 608 and 614 and inductances 610, 612, and 616 may be representative of capacitances and inductances of the transmitter 602 and receiver 604, and do not necessarily correspond to actual physical components. For example, $L_b$ 610 may correspond to an input inductance associated with transforming a voltage source (e.g., an inverter) into a current source. This may be done in embodiments where the transmitter 602 comprises a parallel tuned resonant circuit (e.g., characterized by capacitance $C_1$ 608 and inductance $L_1$ 612), which may require being driven by a current source 620. In some embodiments, a topology for a parallel tuned inductive power transfer (IPT) system, such as that illustrated in FIG. 6, may be referred to as an LCL tuning topology, as it is characterized by three different tuning elements having the same reactance at the resonant frequency. In other embodiments, the transmitter 602 and/or receiver 604 may comprise series tuned resonant circuits.

In some embodiments, the transmitter 602 and the receiver 604 may be separated by an offset 606 corresponding to a physical distance between the transmitter 602 and the receiver 604. While the illustrated figure shows the transmitter 602 and receiver 604 as being oriented horizontally relative to each other and separated by a horizontal offset 606, in many vehicle charging configurations, the transmitter 602 may be located in a base pad on the ground (not shown), while the receiver 604 may be located in a vehicle pad at the underside of a vehicle (not shown). As such, the offset 606 may be a vertical offset (also referred to as a "Z-gap"). The Z-gap 606 may be based upon one or more dimensions of the vehicle. For example, different types of vehicles may have different ground clearances, resulting in different Z-gaps between the transmitter 602 of the base pad and the receiver 604 of the vehicle pad for the different vehicle types. As illustrated in FIG. 6, the offset 606 is along a z-axis (and is hence referred to as a Z-gap), while the x-axis and y-axis correspond to axes orthogonal to the direction of offset 606. In some embodiments, the transmitter 602 and the receiver 604 may also be offset along the x-axis or y-axis (not shown).

In some embodiments, different offsets 606 may cause detuning effects between the transmitter 602 and the receiver 604. For example, while the capacitance values of the transmitter 602 and the receiver 604 (e.g., $C_1$ 608 and $C_2$ 614) may remain fixed regardless of the value of offset 606, the inductance of the transmitter 602 and the receiver 604 (e.g., $L_b$ 610, $L_1$ 612, $L_2$ 614) may change based upon the value of offset 606. These changes in inductance may cause the resonant frequencies of the transmitter 602 and the receiver 604 to drift away from each other, creating undesirable detuning effects.

In some embodiments, detuning effects caused by the different resonant frequencies of the transmitter 602 and the receiver 604 may cause reactive currents to form in the transmitter 602 and/or the receiver 604. This may increase system losses and reduce efficiencies of the wireless charging system 600. In some embodiments, the transmitter 602 and/or the receiver 604 may be constructed using higher rated components in order to handle the additional reactive power caused by detuning. However, while the use of higher rated components may allow for the system 600 to be able to handle additional reactive power, the lowered efficiency of the system 600 is not addressed.

In some embodiments, in order to reduce detuning and compensate for at least a portion of the reactive power caused by detuning, the operating frequency of the transmitter 602 (e.g., as specified by the controller 415 and oscillator 412) may be adjusted. For example, the operating frequency may be adjusted between 81.3 kHz and 90 kHz, as proposed in various wireless charging standards. However, varying the system frequency in real-time while charging may be a complex process. In addition, varying the operating frequency during operation may, in some embodiments, cause the operating frequency to jump between two different frequencies, a process that may be referred to as bifurcation.

In some embodiments, the transmitter 602 may identify a desired operated frequency prior to the start of charging. The transmitter 602 may then be operated at the identified operating frequency, reducing reactive currents caused by detuning effects and improving system efficiency. As discussed above, detuning effects between the transmitter 602 and the receiver 604 may occur as a result of different inductances (and hence, resonant frequencies) of the transmitter 602 and the receiver 604 (e.g., $L_1$, $L_2$, $L_b$), due to the Z-gap 606 between the transmitter 602 and the receiver 604. On the other hand, misalignments between the transmitter 602 and the receiver 604 in other directions (e.g., along an x or y-axis instead of the z-axis, as illustrated in FIG. 6) may not substantially affect the inductance of the transmitter 602 (e.g., $L_1$, $L_b$) and the inductance of the receiver 604 (e.g., $L_2$). As such, misalignments in other directions may not need to be considered.

In order to determine a desired operating frequency prior to charging, it may first be desirable to estimate a Z-gap 606 between the transmitter 602 and the receiver 604. Because the Z-gap 606 between the transmitter 602 and the receiver 604 is typically not expected to change during the course of charging, the desired operating frequency can be chosen prior to the start of charging and used throughout the charging process.

In some embodiments, the transmitter 602 may determine the Z-gap 606 by taking advantage of a coupling check that is performed between the transmitter 602 and the receiver 604 prior to charging. In some embodiments, the coupling check is performed in order to determine a coupling coefficient between the transmitter 602 and the receiver 604 prior to wireless charging, in order to assess whether the transmitter 602 and the receiver 604 are sufficiently aligned for charging. Example systems and methods for performing the coupling check are disclosed in U.S. Patent Pub. No. 2015/0061578, titled "System and Method for Alignment and Compatibility Detection for a Wireless Power Transfer System," which is hereby incorporated by reference in its entirety.

In some embodiments, the current source 620 may begin the coupling check by injecting a known sense current $I_{sense}$ into the transmitter 602. In some embodiments, the sense current $I_{sense}$ may have a value requested by the receiver 604, or may correspond to a predetermined set value. For example, the sense current $I_{sense}$ may be set to a value corresponding to a known percentage of a maximum available current (e.g., 20%). The receiver 604 may then measure a short circuit current $I_{SC}$ of the receiver 604 in response to the sense current in the transmitter 602 (e.g., by connecting the terminals of the receive antenna 504). The measured short circuit current $I_{SC}$ may be indicative of a level of magnetic coupling between the transmitter 602 and the receiver 604. In some embodiments, the sense current measured by the transmitter 602 may be compared with a maximum current of the transmitter 602 to determine a coupling coefficient based upon the short circuit current $I_{SC}$ measured at the receiver 604. In some embodiments, the sense current and/or maximum current may be based upon a type of transmitter used (e.g., a model of the transmitter 602). In addition, the amount of measured short circuit current $I_{SC}$ may vary based upon one or more innate parameters of the receiver 604, such as number of turns in receiver antenna 504, a shape of the receive antenna 504, and/or the like. From the obtained coupling coefficient, a Z-gap 606 between the transmitter 602 and the receiver 604 can be predicted.

In some embodiments, instead of measuring a short circuit current $I_{SC}$ at the receiver 604, the receiver 604 may instead measure an open circuit voltage to be used to determine the coupling coefficient. For example, as illustrated in FIG. 6, the receiver 604 may comprise a resonant tank circuit characterized by capacitance $C_2$ 614 and inductance $L_2$ 616 able to store energy oscillating at the circuit's resonant frequency. The resonant tank circuit of the receiver 604 may be opened using a switch or relay (not shown). An open circuit voltage may then be measured across the coil of the receiver 604 (e.g., over inductance $L_2$ 616).

Figure 7:
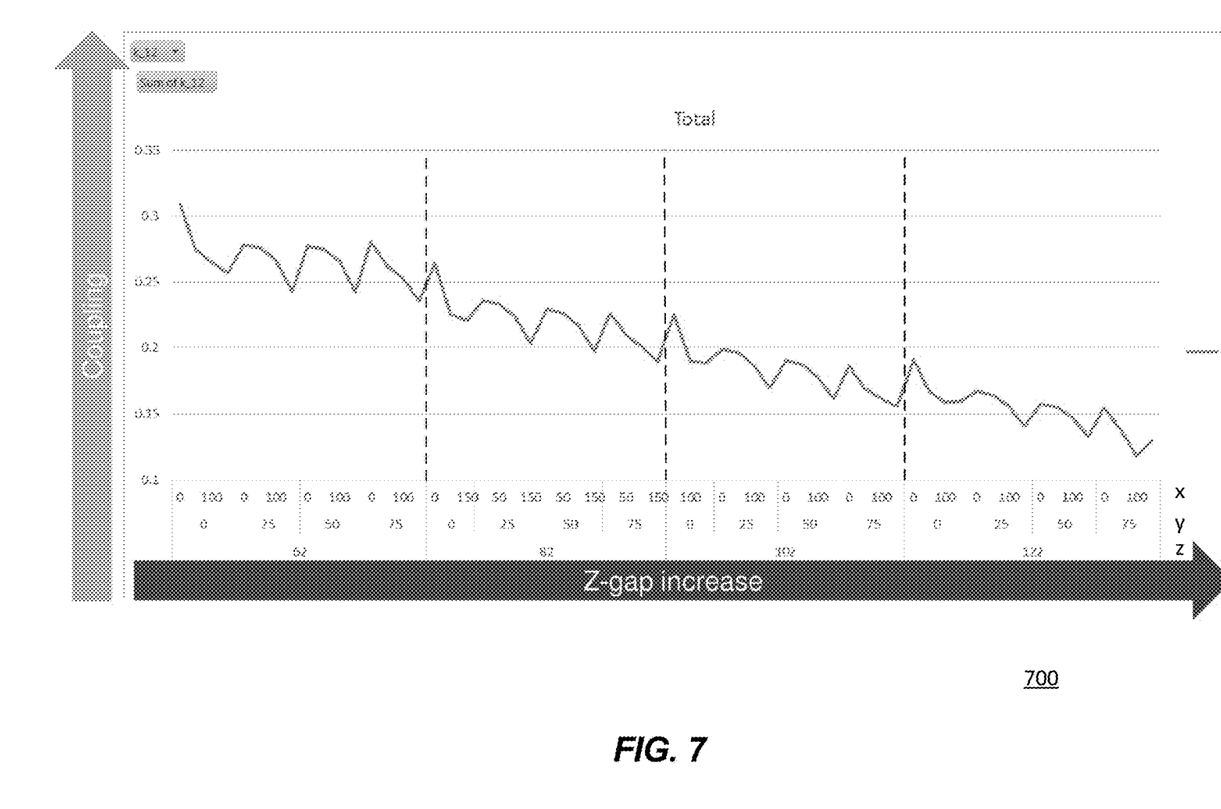
FIG. 7 illustrates a graph showing a relationship between coupling coefficient and Z-gap between transmitter and receiver, in accordance with some embodiments.

FIG. 7 illustrates a graph showing a relationship between coupling coefficient and Z-gap between the transmitter 602 and the receiver 604, in accordance with some embodiments. The graph 700, as shown in FIG. 7, showing coupling coefficients along the y-axis, and relative positions between the transmitter 602 and the receiver 604 along the x-axis. For example, the x-axis of the graph 700 shows three rows of numbers corresponding to offset gaps between the transmitter 602 and the receiver 604 along the x, y, and z-axis (e.g., as illustrated in FIG. 6), respectively. Accordingly, the graph 700 shows the coupling coefficient between the transmitter 602 and the receiver 604 as a function of Z-gap (e.g., offset gap along the z-axis between the transmitter 602 and receiver 604). For example, in the illustrated embodiment, the value of the coupling coefficient is approximately between 0.25 and 0.3 for a small Z-gap value of 62 mm, and generally decreasing for increasing Z-gap values, to between 0.1 and 0.15 when the Z-gap is at 122 mm. Thus, a lower coupling coefficient value may be indicative of a larger Z-gap.

In some embodiments, a memory (not shown) of receiver 604 may store a look-up table (LUT) indicating predicted Z-gap values over different coupling coefficient values. The values for the LUT may be pre-computed by, for each type of receiver 604, measuring the coupling coefficient between the transmitter 602 and the receiver 604 for different Z-gap values. The measured coupling coefficients for different Z-gap values of a particular type of receiver may then be used to populate the LUT for receivers of that type. In some embodiments, the LUT may be stored at the memory 420 of the transmitter 602.

By using the LUT, the controller 516 for the receiver 604 can, after determining a coupling coefficient value as the result of performing a coupling check, determine a predicted Z-gap value based upon the determined coupling coefficient value. In other embodiments, instead of an LUT, the controller 516 may interpolate the measured coupling coefficients for different Z-gap values to determine one or more functions that can be used to compute a Z-gap from a coupling coefficient. The one or more functions may be stored in the memory of the receiver 604, allowing the controller 516 to apply the one or more functions to a determined coupling coefficient value in order to predict the Z-gap. For example, the plot of graph 700 may be converted into an equation that expresses a relationship between the coupling coefficient between the transmitter 602 and the receiver 604 and the Z-gap between the transmitter 602 and the receiver 604.

Once a Z-gap is determined, the controller 516 may use the predicted Z-gap to determine a desired operating frequency. In some embodiments, the controller 516 may determine the desired operating frequency based upon the predicted Z-gap. In some embodiments, different types of receivers 604 may store different LUTs indicating desired operating frequency values for different Z-gaps, based upon one or more parameters associated with the type of receiver, such as an inductance variation over a range of expected Z-gap values. The values of the LUT may be populated by, for a particular receiver type, determined desired operating frequencies for different Z-gap values. For example, desired operating frequency for a particular Z-gap value selected by the receiver 604 may be configured to reduce an amount of detuning and reactive power when the transmitter 602 is coupled to a receiver 604 for wireless charging, when the transmitter 602 and receiver 604 are offset by the particular Z-gap value. In other embodiments, the controller 516 may interpolate the desired operating frequencies for different Z-gap values to determine one or more functions for calculating the desired operating frequency based upon the predicted Z-gap, which may be stored in the memory. In some embodiments, the transmitter 602 may be standardized (e.g., using the SAE J2954 standard). As such, the receiver 604 may be able to determine the Z-gap value based entirely on the LUT or functions, without requiring additional parameter information from the transmitter 602. In some embodiments where parameters of transmitter 602 are unknown, the transmitter 602 may transmit any necessary parameters to the receiver 604. In some embodiments, certain parameters of the transmitter 602 may not have a substantial effect on the desired operating frequency in comparison to the parameters receiver 604 (e.g., the inductance variation at the transmitter 602 may not affect the desired operating frequency as much as the inductance variation at the receiver 604). As such, in some embodiments, the LUT at the receiver 604 may be constructed without taking into account the specific transmitter parameters.

Figure 8:
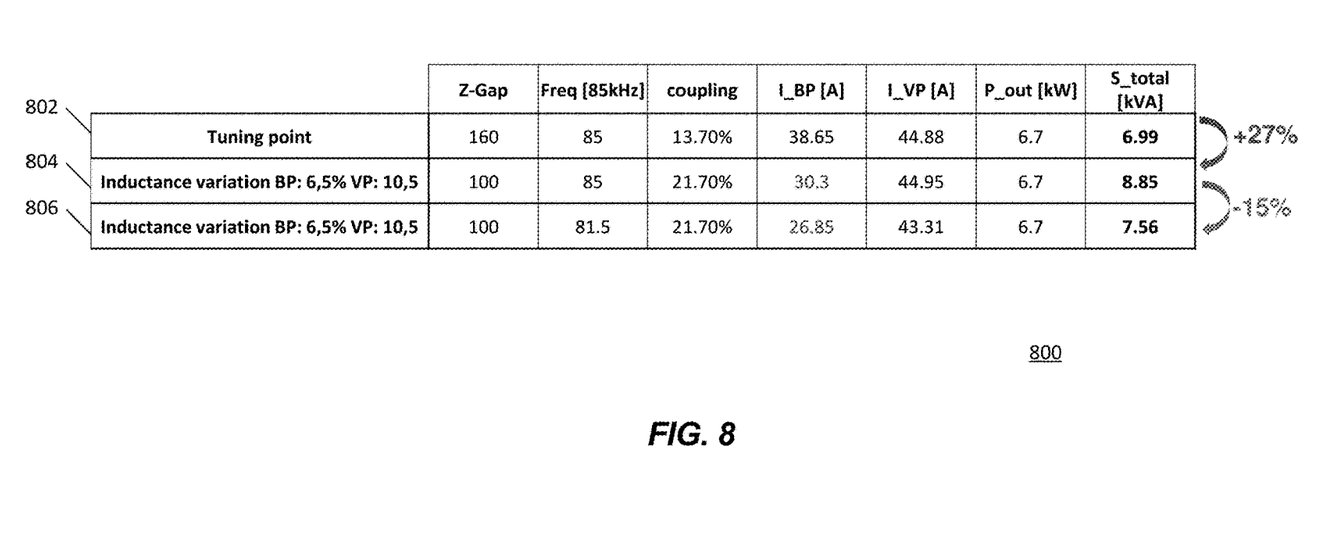
FIG. 8 illustrates a table indicating different Z-gaps and operating frequencies of a wireless charging system, in accordance with some embodiments.

FIG. 8 illustrates a table indicating different Z-gaps and operating frequencies of a wireless charging system containing the transmitter 602 and receiver 604, in accordance with some embodiments. In some embodiments, the transmitter 602 may be tuned for a particular Z-gap value and operating frequency. The tuned Z-gap of the transmitter 602 may typically correspond to a largest Z-gap that the transmitter 602 is expected to encounter for wireless charging, and the tuned operating frequency may correspond to a frequency that minimizes detuning and reactive power when the transmitter 602 is coupled to the receiver 604 for wireless charging with an offset corresponding to the tuned Z-gap value. For example, the tuned Z-gap value of the transmitter 602 may be 160 mm. The tuned operating frequency may be 85 kHz.

Row 802 of table 800 illustrates an arrangement where the transmitter 602 and receiver 604 are offset by the tuned Z-gap value of the transmitter, and the transmitter 602 is operated at the tuned operating frequency. For example, as illustrated in table 800, at the tuned Z-gap value of 160 mm, and the receiver 604 may measure a coupling coefficient of 13.70% between the transmitter 602 and the receiver 604 by performing a coupling check. The transmitter 602 may be operated at a tuned operating frequency of 85 kHz. During charging, this may result in a transmitter or base pad current (I_BP) of 38.65 A, a receiver or vehicle pad current (I_VP) of 44.88 A, and an output power of 6.7 kW. The total power in the system may be measured to be 6.99 kW, indicating the presence of a small amount of reactive power (e.g., as indicated by the difference between total power and output power).

However, as illustrated in row 804, when the Z-gap between the transmitter 602 and the receiver 604 is changed to 100 mm, the coupling check may measure a coupling of 21.70%. The change in Z-gap may result in an inductance change at the base pad (BP) transmitter 602 and the vehicle pad (VP) receiver 604. For example, the base pad (BP) transmitter 602 and vehicle pad (VP) receiver 604 may experience an inductive variation of 6.5% and 10.5% respectively. If the operating frequency of the transmitter 602 is not changed (e.g., remaining at 85 kHz), this may raise the total power in the system to 8.85 kW (a 27% increase compared to when the transmitter 602 was operated at the tuned Z-gap offset of 160 mm), increasing the amount of undesired reactive power.

On the other hand, as illustrated in row 806, if the transmitter 602 adjusts its operating frequency based upon the Z-gap of 100 mm (e.g., by measuring the coupling coefficient of 21.70% during a coupling check and determining the corresponding Z-gap) to a lower value of 81.5 kHz, the power in the system may be reduced (e.g., to 7.56 kW, a 15% decrease from when the transmitter 602 was operated without changing the operating frequency), thus reducing the amount of undesired reactive power in the system. In some embodiments, the adjusted frequency of 81.5 kHz may be determined based upon an amount of inductance variation (e.g., VP inductance variation of 10.5%) based upon the Z-gap value and a known maximum inductance variation or inductance variation range of the receiver 604. In some embodiments, the known maximum inductance variation or inductance variation range of the receiver 604 may be considered when constructing an LUT for the receiver 604, allowing for an operating frequency to be determined from a known Z-gap value.

Figure 9:
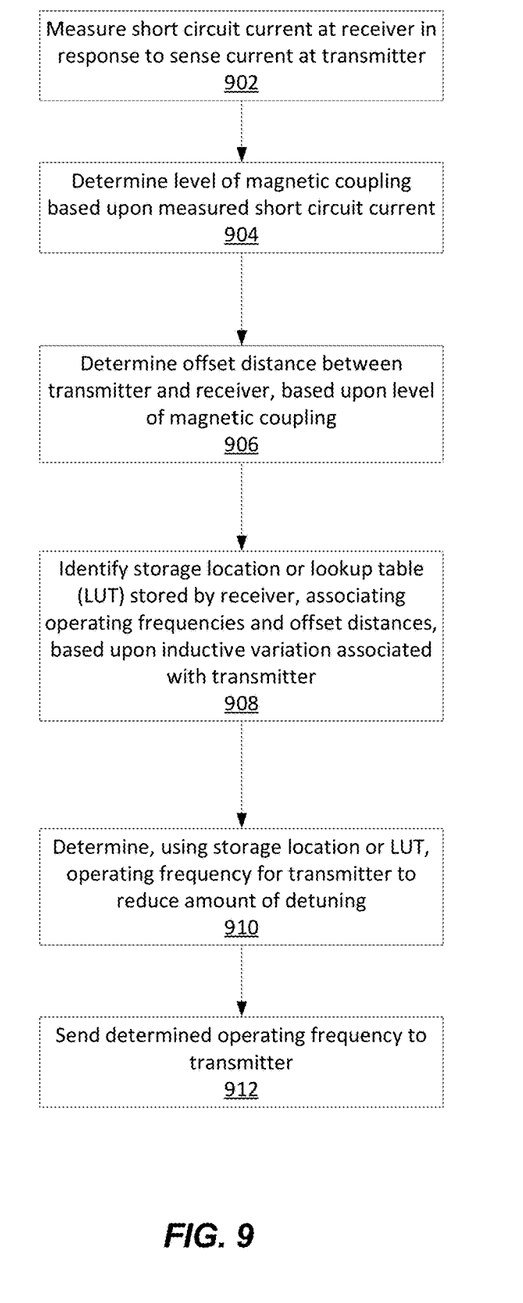
FIG. 9 illustrates a flowchart of an exemplary process for setting an operating frequency of a charging system, in accordance with some embodiments.

FIG. 9 illustrates a flowchart of an example process for setting an operating frequency of a wireless charging system containing the transmitter 602 and the receiver 604, in accordance with some embodiments. At block 902, the receiver 604 measures a short circuit current $I_{SC}$, in response to a sense current $I_{sense}$ run through the transmitter 602 by the current source 620. In some embodiments, instead of measuring the short circuit current $I_{SC}$, the receiver 604 may instead measure an open circuit voltage. In some embodiments, the sense current $I_{sense}$ produced by the current source 620 may have a value requested by the receiver 604. In other embodiments, the value of the sense current $I_{sense}$ may be a predetermined set value. In other embodiments, the transmitter 602 may transmit a value of the sense current $I_{sense}$ to the receiver 604.

At block 904, the receiver 604 determines a level of magnetic coupling between the transmitter 602 and the receiver 604, based upon the measured short circuit current $I_{SC}$. In some embodiments, the receiver 604 may determine the magnetic coupling by comparing the value of the sense current $I_{sense}$ run through the transmitter 602 to a minimum and maximum value in order to determine a coupling coefficient value based upon the measured short-circuit current $I_{SC}$ (or open circuit voltage).

At block 906, the receiver 604 determines an offset distance 606 (e.g., Z-gap) between the transmitter 602 and the receiver 604, based upon the level of magnetic coupling as indicated by the determined coupling coefficient value. In some embodiments, the memory of the receiver 604 may store at a particular storage location a lookup table (LUT) or other data structure that can be used by the controller 516 to predict the offset distance (Z-gap) based upon the level of magnetic coupling. For example, the LUT (or other data structure) may comprise pre-determined values associating different offset distances with different levels of magnetic coupling. In some embodiments, the memory of the receiver 604 may store one or more functions that can be used by the controller 516 to determine the offset distanced based upon an inputted level of magnetic coupling.

In some embodiments, determining the offset distance 606 from the coupling coefficient value may be based upon one or more known parameters of the receiver 604. For example, these parameters may include a number of turns in the receive antenna 504, a size or shape of the receive antenna 504, and/or the like. These parameters may be incorporated in the construction of the LUT or one or more functions at the receiver 604.

At block 908, the receiver 604 identifies a memory storage location, LUT, or other type of data structure stored associated with the receiver 604, comprising pre-determined values associating operating frequencies with different offset distances (Z-gaps). In some embodiments, the pre-determined values may have been determined based upon one or more known parameters of the receiver 604, such as a maximum inductance variation or an inductance variation range over a range of Z-gap values. As used herein, maximum inductance variation of the receiver 604 may refer to a total amount of inductance variation of the receiver 604 between a maximum Z-gap value and a minimum Z-gap value of a range of Z-gap values.

As such, each model of receiver 604 may have a different set pre-determined values based upon the type of receiver's innate properties stored at the storage location or in the LUT or other data structure. In some embodiments, one or more functions associating operating frequencies with different Z-gap may be identified instead of an LUT.

At block 910, the receiver 604 uses the identified pre-determined values of the LUT or other data structure to determine an operating frequency for operating the transmitter 602, the operating frequency selected based upon the predicted offset distance and configured to reduce an amount of detuning (and hence reactive power) in the system 100. In other embodiments, the receiver may use the one or more stored functions to determine the operating frequency based upon the predicted offset distance. In some embodiments, the receiver 604 may determine an amount of inductance variation at the receiver 604 (e.g., VP inductance variation) corresponding to the Z-gap value, based upon the maximum inductance variation or inductance variation range of the receiver 604, which may then be used to determine the operating frequency. In some embodiments, the maximum inductance variation or inductance variation range of the receiver 604, and/or other known parameters of the receiver 604 may have been used in the construction of the LUT or other data structure for the receiver 604.

At block 912, the receiver 604 transmits the determined operating frequency to the transmitter 602, which may then be operated using a current source 620 with an alternating electric current at the determined operating frequency and used to charge a load at the receiver 604 (e.g., the battery of a battery powered vehicle).

As discussed above, in some embodiments, data structures (e.g., LUTs) stored at a memory storage location may contain pre-determined values associating levels of coupling with offset distances, and pre-determined values associating offset distances with operating frequencies. In some embodiments, the data structure may contain pre-determined values associating levels of coupling with operating frequencies, such that a desired operating frequency for reducing a level of detuning can be determined directly using a determined level of coupling.

While the above process discusses determining the Z-gap and desired operating frequency at the receiver 604, in some embodiments, the process may be performed by the transmitter 602. For example, in some embodiments, the transmitter 602 may receive from the receiver 604 an indication of a short circuit voltage measured in response to a sense current $I_{sense}$ at the transmitter 602. The transmitter 602 may use the indication of the measured short circuit current $I_{SC}$ to determine a level of magnetic coupling. An LUT or one or more functions stored at the transmitter 602 (e.g., in memory 420) may be used to determine a Z-gap between the transmitter 602 and the receiver 604. The determined Z-gap may then be used by the transmitter 602 to determine an operating frequency (e.g., by using an LUT or one or more stored functions).

Figure 10A:
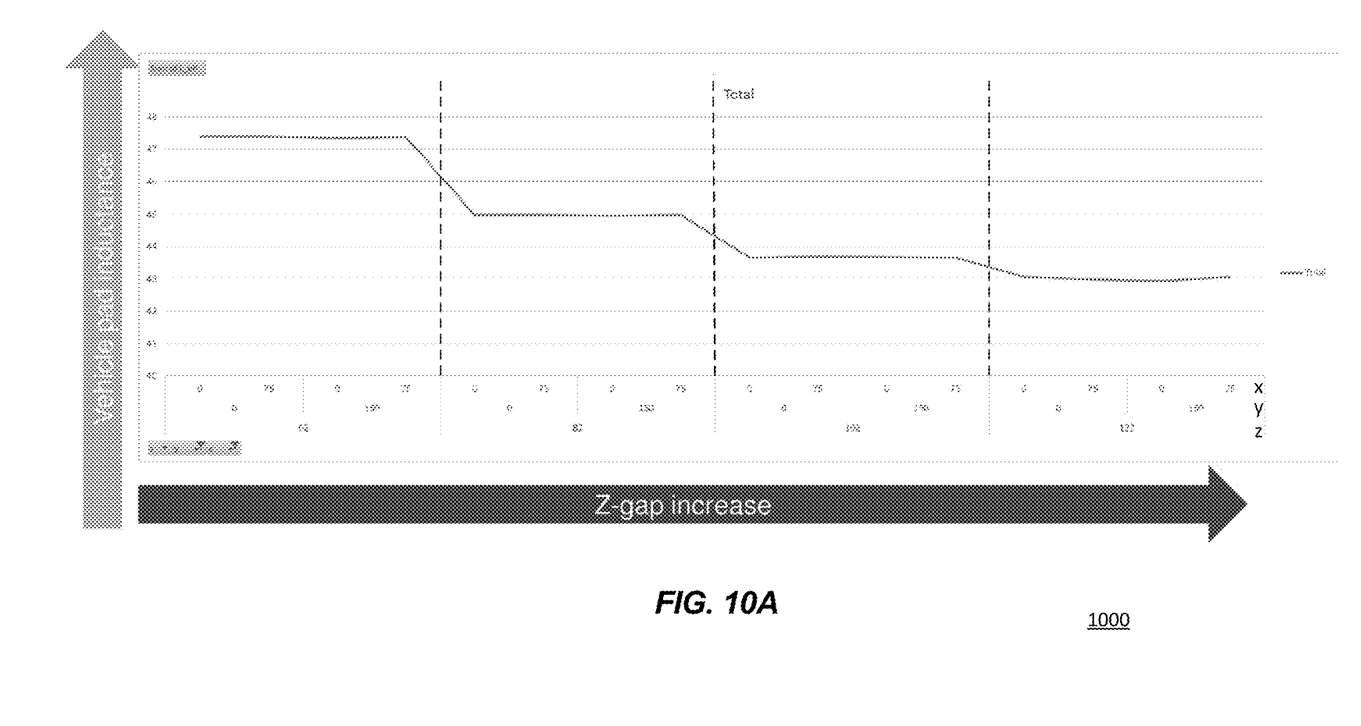
FIGS. 10A and 10B illustrate graphs showing correlations between Z-gap and base and/or vehicle pad inductance, in accordance with some embodiments.
Figure 10B:
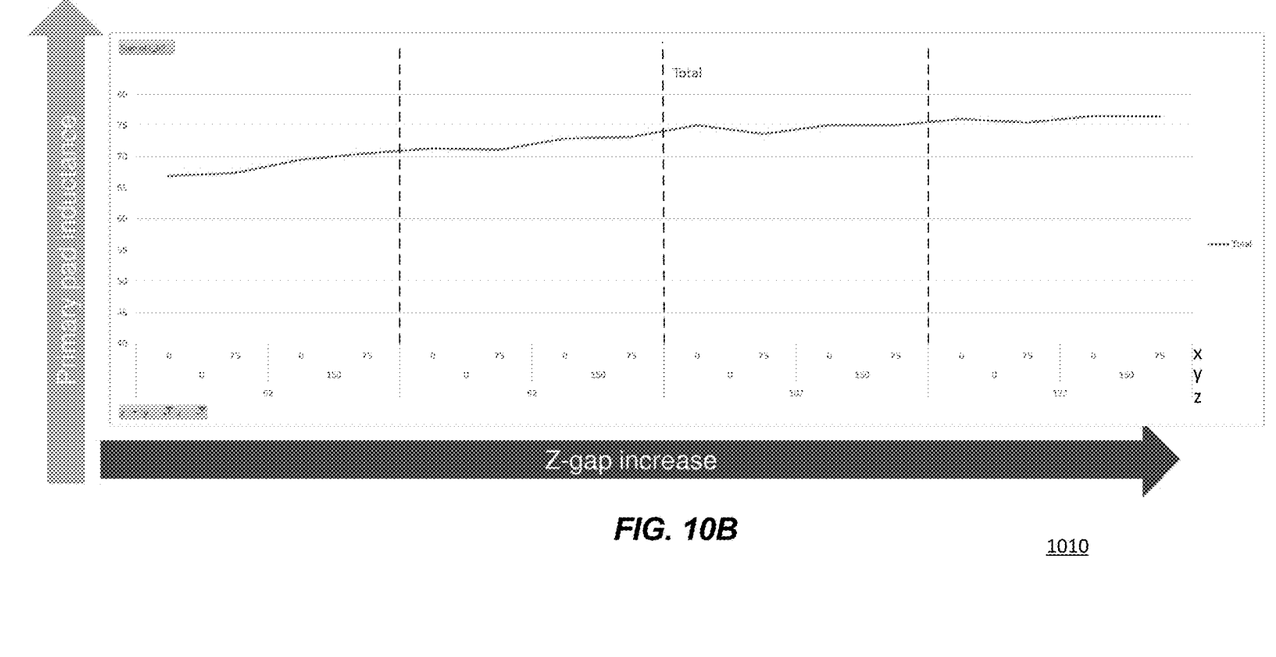

In some embodiments, the Z-gap between the transmitter 602 and the receiver 604 may be determined based upon a measured vehicle pad inductance and/or a base pad inductance. FIGS. 10A and 10B illustrate graphs showing correlations between Z-gap values and base and/or vehicle pad inductance, in accordance with some embodiments. Graph 1000 of FIG. 10A illustrates a relationship between vehicle pad inductance represented on the y-axis, and different combinations of offsets along the x, y, and z axes represented on the x-axis. For example, the vehicle pad inductance in a particular embodiment may have a value between 47 uH and 48 uH when the Z-gap is at 62 mm, and may decrease in steps as the Z-gap increases, to a value of approximately 43 mH when the Z-gap is at 122 mm.

On the other hand, graph 1010 of FIG. 10B illustrates a relationship between base (primary) pad inductance on the y-axis, and different combinations of offsets along the x, y, and z axes on the x-axis, in accordance with some embodiments. For example, at a Z-gap of 62 mm, the base pad inductance may be approximately 67 uH. The base pad inductance may increase gradually as Z-gap is increased, reaching a value of approximately 76 uH when the Z-gap has been increased to 122 mm.

By setting an operating frequency before the start of charging, wireless charging can be performed with reduced detuning effects and without the complications associated with attempting to adjust operating frequency on the fly. Because the Z-gap value between the transmitter and receiver is typically expected to remain substantially constant during the course of charging, a desired operating frequency can be predetermined and used throughout the charging process.

For purposes of summarizing the disclosure, certain aspects, advantages and novel features of the present disclosure have been described herein. It is to be understood that not necessarily all such advantages can be achieved in accordance with any particular embodiment of the present disclosure. Thus, the present disclosure can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the present disclosure. Thus, the present present disclosure is not intended to be limited to the embodiments shown herein but is to be accorded the widest scope consistent with the principles and novel features disclosed herein.

What is claimed is:

1. An apparatus for wirelessly receiving power from a transmitter circuit configured to generate a magnetic field in response to a driving current at an operating frequency, the apparatus comprising:
   a receiver circuit configured to receive power via the magnetic field, wherein the transmitter circuit and the receiver circuit are separated by an offset distance; and
   a controller circuit operationally coupled to the receiver circuit and configured to:
      measure a current or voltage value associated with the receiver circuit in response to a sense current driving the transmitter circuit at the operating frequency,
      determine the offset distance between the transmitter circuit and the receiver circuit based at least in part on (a) the measured current value or the measured voltage value and (b) a maximum current value available for driving the transmitter circuit,
      determine a level of coupling between the transmitter circuit and the receiver circuit based on a comparison of the sense current to the maximum current value, and
      determine an updated operating frequency of the current driving the transmitter circuit based on the determined offset distance and at least one known inductance variation parameter of the receiver circuit.

2. The apparatus of claim 1, wherein the at least one known inductance variation parameter of the receiver circuit comprises a maximum inductance variation of the receiver circuit over a range of offset distances.

3. The apparatus of claim 1, wherein the controller is further configured to cause an indication of the updated operating frequency to be transmitted to the transmitter circuit.

4. The apparatus of claim 1, wherein the transmitter circuit comprises a resonant transmitter circuit, and the receiver circuit comprises a resonant receiver circuit.

5. The apparatus of claim 1, wherein the determined offset distance is further based on an inductive variation of the receiver circuit and an inductive variation of the transmitter circuit.

6. The apparatus of claim 1, further comprising at least one storage location comprising pre-determined values associating a plurality of different determined offset distances with respective operating frequencies;
   wherein the updated operating frequency is an operating frequency associated with the determined offset distance based upon the pre-determined values.

7. The apparatus of claim 6, wherein the measured current or voltage value is representative of the coupling level between the transmitter circuit and the receiver circuit; and
   wherein the at least one storage location corresponds to at least a first look-up table storing pre-determined values associating a plurality of different levels of coupling levels with the plurality of different determined offset distances.

8. The apparatus of claim 7, wherein the at least one storage location further corresponds to at least a second look-up table storing pre-determined values associating the plurality of different determined offset distances with the respective operating frequencies.

9. The apparatus of claim 7, wherein the measured current value corresponds to a short circuit current of the receiver circuit in response to the sense current driving the transmitter circuit.

10. The apparatus of claim 1, wherein the voltage value corresponds to an open circuit voltage of the receiver circuit in response to the sense current driving the transmitter circuit.

11. The apparatus of claim 1, wherein the operating frequency is more detuned at the determined offset distance as compared to the updated operating frequency.

12. A method for setting an operating frequency in a wireless charging system, the wireless charging system comprising a transmitter circuit configured to generate a magnetic field in response to a driving current at an operating frequency, and a receiver circuit configured to receive power via the magnetic field, wherein the transmitter circuit and the receiver circuit are separated by an offset distance that contributes to a level of detuning between the transmitter and receiver circuits, the method comprising:
   measuring a current or voltage value associated with the receiver circuit in response to a sense current driving the transmitter circuit at the operating frequency;
   determining the offset distance between the transmitter circuit and the receiver circuit based at least in part on (a) the measured current value or the measured voltage value and (b) a maximum current available for driving the transmit circuit;
   determining a level of coupling between the transmitter circuit and the receiver circuit based on a comparison of the sense current to the maximum current value; and
   determining an updated operating frequency of the current driving the transmitter circuit based on the determined offset distance and at least one known inductance variation parameter of the receiver circuit.

13. The method of claim 12, wherein the at least one known parameter of the receiver circuit comprises a maximum inductance variation of the receiver circuit over a range of offset distances.

14. The method of claim 12, further comprising causing an indication of the updated operating frequency to be transmitted from the receiver circuit to the transmitter circuit.

15. The method of claim 12, wherein the transmitter circuit comprises a resonant transmitter circuit, and the receiver circuit comprises a resonant receiver circuit.

16. The method of claim 12, wherein determining the updated operating frequency comprises identifying at least one storage location comprising pre-determined values associating a plurality of different determined offset distances with respective operating frequencies, wherein the updated operating frequency is an operating frequency associated with the determined offset distance based upon the pre-determined values.

17. The method of claim 12, wherein determining the offset distance comprises identifying at least one storage location corresponding to at least a first look-up table storing pre-determined values associating the plurality of different levels of coupling levels with a plurality of different offset distances.

18. The method of claim 17, wherein determining the updated operating frequency comprises identifying at least one storage location storing at least a second look-up table storing pre-determined values associating the plurality of different offset distances with operating frequencies.

19. The method of claim 12, wherein the measured current or voltage value corresponds to a short circuit current of the receiver circuit in response to the sense current driving the transmitter circuit.

20. The method of claim 12, wherein the measured current or voltage value corresponds to an open circuit voltage of the receiver circuit in response to the sense current driving the transmitter circuit.

21. The method of claim 12, wherein the operating frequency is more detuned at the determined offset distance as compared to the updated operating frequency.

22. An apparatus for wirelessly receiving power from a transmitter means configured to generate a magnetic field in response to a driving current at an operating frequency, the apparatus comprising:
means for receiving wireless power via the magnetic field, wherein the transmitter means and the receiving means are separated by an offset distance that contributes to a level of detuning between the transmitter and receiving means;
means for measuring a current or voltage value associated with the receiving means in response to a sense current driving the transmitter circuit at the operating frequency;
means for determining the offset distance between the transmitter circuit and the receiving means based at least in part on (a) the measured current value or the measured voltage value and (b) a maximum current value available for driving the transmit circuit;
means for determining a level of coupling between the transmitter means and the receiving means based on a comparison of the sense current to the maximum current value; and
means for determining an updated operating frequency of the current driving the transmitter circuit based on the determined offset distance and at least one known inductance variation parameter of the receiving means.

23. The apparatus of claim 22, wherein the at least one known parameter of the receiving means comprises a maximum inductance variation of the receiving means over a range of offset distances.

24. The apparatus of claim 22, further comprising causing an indication of the updated operating frequency to be transmitted from the receiving means to the transmitter circuit.

25. The apparatus of claim 22, wherein the means for determining the updated operating frequency comprises means for identifying at least one storage location comprising pre-determined values associating a plurality of different determined offset distances with respective operating frequencies, wherein the updated operating frequency is an operating frequency associated with the determined offset distance based upon the pre-determined values.

26. The apparatus of claim 22, wherein the means for determining the offset distance comprises means for identifying at least one storage location corresponding to at least a first look-up table storing pre-determined values associating the plurality of different levels of coupling levels with a plurality of different offset distances.

27. The apparatus of claim 26, wherein the means for determining the updated operating frequency comprises means for identifying at least one storage location storing at least a second look-up table storing pre-determined values associating the plurality of different offset distances with operating frequencies.

28. The apparatus of claim 22, wherein the operating frequency is more detuned at the determined offset distance as compared to the updated operating frequency.

* * * * *